L. W. CHUBB.
CIRCUIT INTERRUPTING SYSTEM.
APPLICATION FILED JAN. 6, 1917.

1,287,232.

Patented Dec. 10, 1918.

WITNESSES:
William Siler
J A Procter

INVENTOR
Lewis W. Chubb.
BY
Wesley G Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING SYSTEM.

1,287,232.     Specification of Letters Patent.     Patented Dec. 10, 1918.

Application filed January 6, 1917. Serial No. 140,941.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Circuit-Interrupting Systems, of which the following is a specification.

My invention relates to circuit-interrupting systems and particularly to circuit interrupters that are adapted to open at the zero value of the current wave traversing the same.

One object of my invention is to provide a circuit interrupter of the above indicated character that shall have means for energizing its trip coil a sufficient interval of time before the current wave, having a predetermined value, passes through its zero value to permit the circuit interrupter to open when no current traverses the same.

Another object of my invention is to provide means for a circuit interrupter of the above indicated character that shall be adapted to so flatten the current wave where it passes through its zero value that any irregularities in the time of operation of the interrupter will not cause the circuit to be interrupted at any point but substantially the zero value of the current wave.

My copending application Serial No. 95,053, filed May 3, 1916, discloses a resonant or tuned device that is connected to the main circuit for so controlling the trip coil of the circuit interrupter that it will be energized a sufficient time interval before the instantaneous value of the current having a predetermined overload value passes through its zero value to permit the interrupter to open only when no current traverses the same. It is, of course, understood that the time of energization of the trip coil is determined by the speed of operation of the interrupter.

A device of the above indicated character will operate satisfactorily if the time required for the interrupter to operate is invariable. However, because of changes in temperature and friction, the time required for interrupters to operate varies over a small range. In view of the above, I provide means, comprising a normally saturated reactor and a condenser, for so changing the contour of the current wave as it passes through the interrupter that it will be substantially flat at its zero value for a sufficient time to preclude the interrupter opening at any point on the current wave except substantially its zero value.

Figure 1:
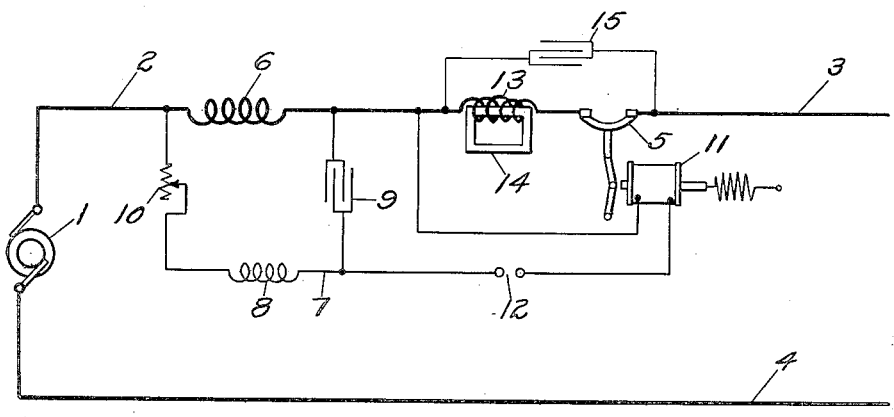
Figure 2:
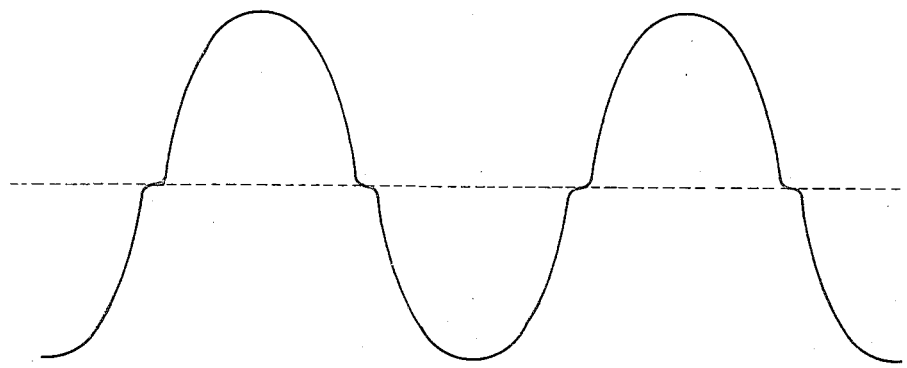

In the accompanying drawings, Figure 1 is a diagrammatic view of an electric circuit embodying my invention, and Fig. 2 is a diagram illustrating the change in the current wave that is effected by the use of my invention.

A generator 1 supplies current to a circuit 2 comprising conductors 3 and 4. A circuit interrupter 5 is connected in circuit with conductor 3 of the circuit 2 for the purpose of opening the same when the current reaches a predetermined value. While I have shown the circuit interrupter as connected in only one conductor of the circuit, it will, of course, be understood that both conductors of the circuit may be protected in the same manner.

An impedance coil 6 having a relatively small impedance is connected in circuit with the conductor 3, and a series resonant circuit 7, comprising a reactor 8, a condenser 9 and a variable resistor 10, is connected in shunt relation to the impedance coil 6. A trip coil 11 is connected in series relation to a spark gap 12, and the circuit, thus constituted, is connected in shunt relation to the condenser 9.

A reactance coil 13 having a normally saturated magnetizable core member 14 is connected in series with the conductor 3, and a condenser 15 is connected in shunt relation to the coil 13 and the interrupter for purposes hereinafter more fully set forth.

If the impedance coil 6 were entirely non-inductive, the potential across the condenser 9 would be in quadrature with, and proportional to, the current traversing the conductor 3. Hence, its maximum value would occur at the time that the instantaneous value of the current traversing the conductor 3 would be zero. Therefore, if the spark gap 12 is so set that it will break down when this predetermined maximum value is reached, the trip coil 11 will be energized and the circuit interrupter 5 will open. However, since the circuit interrupter 5 operates a substantially definite time after the trip coil 11 is energized, the instantaneous value of the current traversing the circuit 3 may be other than its zero value when the circuit interrupter 5 is tripped.

If the impedance coil 6 is so constructed as to be partially inductive, the phase-relation of the voltage of the condenser 9 to the voltage drop across the impedance coil 6 may be so advanced that its maximum value will occur a time interval before the instantaneous zero value of the current that traverses the circuit 3. Thus, if this phase-angle is so proportioned that it corresponds to the average time required for the circuit interrupter to operate, the circuit interrupter will open when the current traversing it is substantially zero and, consequently, the interrupter 5 may be relatively small and inexpensive to construct.

The time of operation of the circuit interrupter 5 is dependent upon several factors. That is, the various temperatures to which it is subjected, the friction of the moving parts and the impulse or flow of current in the trip coil 11. Since the electrical impulse of the current traversing the trip coil 11 is the discharge of the condenser 9 of definite capacitance which is charged to a voltage equal to the sparking potential of the definite air gap 12, it may be assumed that this condition is always constant. However, the other conditions cause the time of operation of the circuit interrupter to vary over a relatively small range, and, in order to preclude the small change in the time of operation of the circuit interrupter from causing the same to open the circuit at any value other than substantially its zero value, I provide means comprising the reactor 13 and the condenser 15 for so flattening the current wave that traverses the interrupter 5 at its zero value that the opening of the circuit at the zero value of the current wave is obtained under all conditions.

Since the magnetizable core member 14 is normally saturated, it requires a relatively small change of current to change its saturation from positive to negative or vice versa. However, when the current wave is approaching its zero value, the reactance coil 13, because of the small change in current required to change the magnetization of the core 14 from positive to negative, sets up a relatively high counter-electromotive force that causes current to be shunted from the interrupter 5 through the condenser 15. Thus, sufficient current will be shunted through the condenser 15 when the current wave passes through its zero value to substantially flatten the same and prolong the time required for the wave to pass through its zero value.

By the use of the reactance coil 13 and the condenser 15, small changes in the time required for the interrupter to operate will not cause the interrupter 5 to be opened at any point other than the zero value of the current wave.

The variable resistor 10 is utilized for producing such a dull resonance in the circuit 7 that the interrupter 5 may be accurately tripped with variations of frequency in the circuit. The resistor 10 may be used for adjusting the interrupter 5 to trip at various overloads and to manually trip the same. If the resistance of the resistor 10 is decreased, an increased current will traverse the circuit 7, and the potential of the condenser 9 and the current that traverses the circuit may be varied without changing the value of the impulse of current that traverses the trip coil 11.

While I have described my invention with respect to the tripping of a circuit interrupter when the instantaneous value of current traversing it is zero, I do not limit my invention to the particular arrangement illustrated, as many modifications may be used without departing from the spirit and scope of the invention as set forth in the appended claims.

I claim as my invention:

1. In an electric circuit, the combination with a circuit interrupter, a trip coil therefor, and means dependent upon an overload on the circuit for so energizing the trip coil that the interrupter may trip at the instant the wave of the current traversing the circuit passes through its zero value, of means for so altering the shape of the current wave that the time required for it to pass through its zero value is relatively long.

2. In an electric circuit, the combination with a circuit interrupter, a trip coil therefor, and means dependent upon an overload on the circuit for so energizing the trip coil that the interrupter may trip at the instant the wave of the current traversing the circuit passes through its zero value, of means for causing the wave of the current to be substantially flattened at its zero value.

3. In an electric circuit, the combination with a circuit interrupter, a trip coil therefor, and means for energizing the trip coil under predetermined conditions, of means for causing the wave of the current that traverses the interrupter to be substantially flattened at its zero value to permit the interrupter to be opened at the zero point of the current wave.

4. In an electrical circuit, the combination with a circuit interrupter and means for causing the interrupter to open the circuit only at the zero value of its current wave, of means for flattening the current wave when it passes through its zero value.

5. The combination with an alternating-current circuit and means for interrupting the circuit only at the zero value of its current wave, of means for causing the current wave to lag in time while passing through its zero value.

6. The combination with an alternating-current circuit and means for interrupting the circuit only at the zero value of its current wave, of means for so altering the shape of the current wave of the circuit that the time required for it to pass through its zero value is relatively long.

7. The combination with a circuit interrupter and means for causing the interrupter to open the circuit only at the zero value of its current wave, of means for so altering the shape of the current wave that the time required for it to pass through its zero value is relatively long.

8. The combination with an alternating-current circuit and means for interrupting the circuit only at the zero value of its current wave, of a reactor and a condenser so connected to the circuit that the current wave is substantially flat at its zero value.

9. The combination with an alternating-current circuit and means for interrupting the circuit at the zero value of the current wave, of means for so increasing the time required for the current wave to pass through its zero value that the circuit is caused to be interrupted positively at the zero value of the current wave.

10. The combination with an alternating-current circuit and means for interrupting the circuit only at the zero value of its current wave, of a normally saturated reactor and a condenser so connected to the circuit that the current wave is substantially flat at its zero value.

In testimony whereof, I have hereunto subscribed my name this 27th day of Dec., 1916.

LEWIS W. CHUBB.